Patented May 10, 1949

2,469,696

UNITED STATES PATENT OFFICE 2,469,696

PROCESS FOR PREPARING WATER-SOLUBLE POLYACRYLAMIDE

Louis M. Minsk and William O. Kenyon, Rochester, N. Y., assignors to Eastman Kodak Company, Rochester, N. Y., a corporation of New Jersey No Drawing. Application July 22, 1946, Serial No. 685,377

5 Claims. (Cl. 260—83)

This invention relates to a process for the preparation of water-soluble polyacrylamides and more particularly, to a process for preparing water-soluble polyacrylamides from polyacrylyl chorlide and ammonia.

It is known that polyacrylic acid chlorides, when treated with ammonia, react vigorously with the separation of ammonium chloride and the formation of acid amides which are insoluble in water and frequently also of diketo-piperidine compounds which are also insoluble in water (Mark et al.—U. S. Patent No. 1,984,417). We have now found contrary to the prior art that water-soluble polyacrylamides can be obtained by the process of slowly adding polyacrylyl chloride dissolved in an organic solvent, for example in dry acetone, to an excess of liquid ammonia. The products so obtained contain acrylimide groups substantially above 25 per cent by weight, and have the property of precipitating from their aqueous solutions by the addition of acid.

Structurally, the products obtained by our new process can be represented by one of the following structures depending on whether the polymerization of the polyacrylyl chloride employed as the starting material takes place in a random order, or head to tail, or head to head, tail to tail, sequence:

1a. 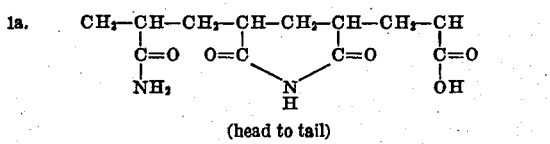

(head to tail)

1b. 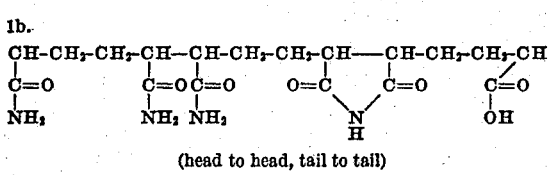

(head to head, tail to tail)

While the carboxylic acid groups have been represented in the formulas as free acid groups, it will be understood that they are actually combined as ammonium salts due to the use of excess of ammonia in the method of preparation. In general, the above formulas are only illustrative of the type of groups present in the molecule with no attempt made to place the respective groups upon a quantitative relationship. However, for analytical and definitive purposes, the term "acrylamide" refers to the grouping

the term "acrylimide" to the grouping

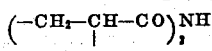

and the term "combined acrylic acid" to the grouping

It is, accordingly, an object of our invention to provide a new process for the preparation of water-soluble polyacrylamides. Other objects will become apparent hereinafter.

The analytical data presented in the specification and claims are based on determinations within limits of error. For example, the proportions of acrylimide and acrylamide groups in the compounds are calculated from the determinations of total nitrogen by the Dumas method, and combined acrylic acid by the titration method using standard sodium hydroxide solution and phenolphthalein as the indicator. Since in the ordinary routine micro analytical procedure for nitrogen, the permissible error is of the order of 0.4 actual per cent, and since the accuracy of the nitrogen analysis controls the corresponding accuracy of the calculation for imide content, the values quoted for the imide content of the different polymers may be in error as much as 5 per cent from the actual. The specific viscosities are determined by dissolving 0.100 gram of the polymer in 100 c. c. of acetone and measuring the time of flow of the solution, divided by the time of flow of the solvent, minus one, in an Ostwald viscosimeter at 25° C.

The following examples will serve to illustrate the process of our invention for obtaining water-soluble imide group containing polyacrylamides.

PREPARATION OF ACRYLYL CHLORIDE 792 grams of acrylic acid of melting point 11.5° C. or higher and 1190 grams of thionyl chloride were placed in a reflux apparatus equipped with a calcium chloride tube, and after about one hour, the mixture was gently heated on a steam bath for about 4 hours. After the evolution of hydrogen chloride had ceased, the product was separated from the reaction mass by fractional distillation. The redistilled product of acrylyl chloride amounted to 620 grams, was colorless, had a boiling point of 73°–74° C. No trace of sulfur was detected in this product.

POLYMERIZATION OF ACRYLYL CHLORIDE 250 grams of acrylyl chloride were diluted with 250 c. c. of dry 1,4-dioxane in a glass tube equipped with a reflux condenser and protected from atmospheric moisture by means of a calcium chloride tube. The tube was designed to be maintained in a horizontal position, while the condenser was in vertical position. The tube and contents were placed in a position 11 inches from the light source and irradiated by a quartz mercury arc operating at 150 volts and 4 amperes. In about 12 hours, a clear viscous dope was obtained, which was then diluted with an equal volume of dry dioxane and poured into dry benzene. The polymer precipitated at once and was filtered off, washed with several changes of dry benzene and dried in a vacuum desiccator over calcium chloride under constant vacuum. The yield of polyacrylyl chloride was 208 grams equivalent to 83 per cent of theory. The specific viscosity of the product in acetone was 0.035. It was completely soluble in acetone and in dioxane. However, on long keeping, the polymer tended to lose hydrogen chloride and solubility.

EXAMPLE I

Amidation of polyacrylyl chloride 150 grams of polyacrylyl chloride were dissolved in 1500 c. c. of dry acetone. The solution was divided into five equal portions. Each portion was then slowly added from a dropping funnel into 350 c. c. (equivalent to 224 grams) of liquid ammonia, agitating meanwhile with a motor driven stirrer. A white precipitate formed in each case. The mixtures of acetone and ammonia were removed by decantation and the precipitates from each portion were dissolved in 120 c. c. of water. After filtering, the separate aqueous dopes were combined and poured in a fine stream with stirring into 5 liters of methanol. The precipitate so obtained was filtered off, washed with several changes of fresh methanol, followed by washing with acetone and then dried at room temperature over calcium chloride in a vacuum desiccator under constant vacuum. The yield was 106 grams or about 90 per cent of theory. The nitrogen content was found to be 15.57 percent by weight compared to a theoretical nitrogen content of 19.72 percent for pure polyacrylamide and 11.2 percent for pure polyacrylimide.

Other samples similarly prepared had nitrogen contents of 15.52 per cent and 15.40 per cent by weight. Tests for halogen indicated that traces only remained in the products. In all cases, the samples were readily soluble in water at room temperature, but precipitated out from solution on the addition of an excess of an acid such as hydrochloric acid.

EXAMPLE II

Acid form of polyacrylamide product 3 grams of the polymer prepared in the manner described in the preceding example were dispersed in 30 c. c. of distilled water. The solution was made just acid to Congo red indicator with 40 per cent hydrobromic acid and immediately poured with stirring into 500 c. c. of methanol. The precipitate was extracted with fresh 500 c. c. portions, until the methanol extract no longer gave a test for bromide, after two hours of contact with the precipitate. The product was filtered off, dried first in a vacuum desiccator under constant vacuum and then one hour at 55° C. at atmospheric pressure. By direct titration of the product in a solution of 100 parts of distilled water and 10 parts of pyridine with standard sodium hydroxide and using phenolphthalein as the indicator, a content of about 11.05 per cent by weight of combined acrylic acid groups was indicated. The nitrogen content was found by the Dumas method to be 14.85 per cent by weight. From these values an acrylimide group content of 31.6 per cent by weight and an acrylamide group content of 57.4 per cent were calculated.

What we claim is:

1. A process for preparing a water-soluble polyacrylamide comprising adding polyacrylyl chloride dissolved in acetone to more than the stoichiometrically calculated quantity of liquid ammonia required to react with all the chloride atoms contained in the added polyacrylyl chloride to form the said water-soluble polyacrylamide and ammonium chloride, the said polyacrylyl chloride in acetone being added gradually to the liquid ammonia while stirring the reaction mass.

2. A process for preparing a water-soluble polyacrylamide comprising adding polyacrylyl chloride dissolved in acetone to liquid ammonia in the ratio of 1 part by weight of polyacrylyl chloride to not less than 7.5 parts by weight of liquid ammonia, the said polyacrylyl chloride being added gradually to the liquid ammonia while stirring the reaction mass.

3. A process for preparing a water-soluble polyacrylamide comprising adding polyacrylyl chloride dissolved in acetone to liquid ammonia in the ratio of 1 part by weight of polyacrylyl chloride to 7.5 parts by weight of liquid ammonia, the said polyacrylyl chloride being added gradually to the liquid ammonia while stirring the reaction mass.

4. A process for preparing a water-soluble polyacrylamide comprising adding polyacrylyl chloride dissolved in acetone to liquid ammonia in the ratio of 1 part by weight of polyacrylyl chloride to 7.5 parts by weight of liquid ammonia, the said polyacrylyl chloride being added gradually to the liquid ammonia while stirring the reaction mass, removing the fluid mixture of acetone, ammonia and ammonium chloride from the precipitate of polyacrylamide which forms, and washing the precipitate with a saturated aliphatic monohydric alcohol having from 1 to 3 carbon atoms.

5. A process for preparing a water-soluble polyacrylamide comprising adding polyacrylyl chloride dissolved in acetone to liquid ammonia in the ratio of 1 part by weight of polyacrylyl chloride to 7.5 parts by weight of liquid ammonia, the said polyacrylyl chloride in acetone being added gradually to the liquid ammonia while stirring the reaction mass, removing the fluid mixture of acetone, ammonia and ammonium chloride from the precipitate of polyacrylamide which forms, and washing the precipitate with methanol.

LOUIS M. MINSK.
WILLIAM O. KENYON.

REFERENCES CITED

The following references are of record in the file of this patent:

UNITED STATES PATENTS

| Number | Name | Date |
| --- | --- | --- |
| 1,984,417 | Mark et al. | Dec. 18, 1934 |